(12) United States Patent
Mahrholz et al.

(10) Patent No.: US 10,510,494 B2
(45) Date of Patent: Dec. 17, 2019

(54) SUPERCAPACITORS WITH ORIENTED CARBON NANOTUBES AND METHOD OF PRODUCING THEM

(71) Applicant: Deutsches Zentrum fur Luft- und Raumfahrt e.V., Cologne (DE)

(72) Inventors: Thorsten Mahrholz, Salzgitter (DE); Sebastian Geier, Braunschweig (DE)

(73) Assignee: DEUTSCHES ZENTRUM FUR LUFT-UND RAUMFAHRT E.V., Cologne (DE)

( * ) Notice: Subject to any disclaimer, the term of this patent is extended or adjusted under 35 U.S.C. 154(b) by 0 days.

(21) Appl. No.: 15/810,595

(22) Filed: Nov. 13, 2017

(65) Prior Publication Data
US 2018/0082796 A1    Mar. 22, 2018

Related U.S. Application Data

(63) Continuation of application No. PCT/EP2016/061372, filed on May 20, 2016.

(30) Foreign Application Priority Data

May 20, 2016  (DE) ...................... 10 2015 107 982.8

(51) Int. Cl.
*H01G 11/36* (2013.01)
*H01G 11/28* (2013.01)
(Continued)

(52) U.S. Cl.
CPC ............. *H01G 11/36* (2013.01); *H01G 11/26* (2013.01); *H01G 11/28* (2013.01); *H01G 11/56* (2013.01);
(Continued)

(58) Field of Classification Search
CPC ........ H01G 11/36; H01G 11/26; H01G 11/28; H01G 11/56; H01G 11/58; H01G 11/86
See application file for complete search history.

(56) References Cited

U.S. PATENT DOCUMENTS

| | | | |
|---|---|---|---|
| 2007/0076349 | A1 | 4/2007 | Dementiev |
| 2009/0021890 | A1 | 1/2009 | Bourcier |

(Continued)

FOREIGN PATENT DOCUMENTS

| | | |
|---|---|---|
| DE | 100 53 276 C1 | 1/2002 |
| DE | 10 2013 104 396 A1 | 10/2014 |

(Continued)

OTHER PUBLICATIONS

International Preliminary Report on Patentability in co-pending, related PCT Application No. PCT/EP2016/061372, dated Nov. 21, 2017.

*Primary Examiner* — Seahvosh Nikmanesh
(74) *Attorney, Agent, or Firm* — Thomas | Horstemeyer, LLP

(57) ABSTRACT

An electrochemical storage device for storing and providing electrical energy by means of its electrical capacitance comprises an electrode comprising an electrode basis, a counter electrode arranged with a distance to the electrode and comprising a counter electrode basis, and an electrolyte arranged between the electrode and the counter electrode and separating the electrode from the counter electrode. The electrode on the electrode basis and the counter electrode on the counter electrode basis each comprise a surface-enlarging structure. The electrode basis and the counter electrode basis extend in a common contact plane of the electrode and the counter electrode, where they each comprise parts of a conductive contact layer arranged on a non-conductive substrate. Furthermore, a method of manufacturing such a storage device is described.

10 Claims, 4 Drawing Sheets

(51) Int. Cl.
*H01G 11/58* (2013.01)
*H01G 11/56* (2013.01)
*H01G 11/86* (2013.01)
*H01G 11/26* (2013.01)

(52) U.S. Cl.
CPC ............ *H01G 11/58* (2013.01); *H01G 11/86* (2013.01); *Y02E 60/13* (2013.01)

(56) References Cited

U.S. PATENT DOCUMENTS

| | | |
|---|---|---|
| 2011/0073827 A1 | 3/2011 | Rubloff |
| 2011/0183206 A1 | 7/2011 | Davis |
| 2012/0282530 A1* | 11/2012 | Chiang ................ G02F 1/1523 |
| | | 429/336 |
| 2015/0010788 A1 | 1/2015 | Aria |

FOREIGN PATENT DOCUMENTS

| | | |
|---|---|---|
| EP | 1 146 527 A2 | 10/2001 |
| WO | 2002/35564 A1 | 5/2002 |
| WO | 2012/128763 A1 | 9/2012 |
| WO | 2013/066474 A2 | 5/2013 |
| WO | 2013/100753 A1 | 7/2013 |

* cited by examiner

SUPERCAPACITORS WITH ORIENTED CARBON NANOTUBES AND METHOD OF PRODUCING THEM

CROSS REFERENCE TO RELATED APPLICATIONS

This application is a continuation of International Application PCT/EP2016/061372 with an International Filing Date of May 20, 2016 and claiming priority to co-pending German Patent Application No. DE 10 2015 107 982.8 entitled "Superkondensatoren mit ausgerichteten Kohlenstoffnanoröhren and Verfahren zu deren Herstellung", filed on May 20, 2015.

FIELD

The invention relates to an electrochemical storage device with an electrical capacitance for storing and providing electrical energy and a method of manufacturing such a storage device.

Among such storage devices there especially are so-called supercapacitors. The term "supercapacitor" encloses double-layer capacitors, the capacitance of which is mainly governed by a double layer capacitance, pseudocapacitors, the capacitance of which is mainly governed by a pseudocapacitance, and hybrid capacitors, to the capacitance of which both a double-layer capacitance and a pseudo capacitance make substantial contributions.

BACKGROUND

WO 2013/100753 A1 discloses a supercapacitor which comprises a comb-shaped electrode basis and a comb-shaped counter electrode basis, which mesh with one another. On the upper surfaces and on the lower surfaces of the electrode basis and the counter electrode basis, carbon nanotubes are arranged. The carbon nanotubes are perpendicular to the direction of the meshing of electrode basis and counter electrode basis. The supercapacitor is manufactured by applying a material of the electrode basis and the counter electrode basis to a substrate. By means of wet-chemical etching or plasma etching, the material is subsequently removed until the meshing comb-shapes of the electrode basis and the counter electrode basis have been shaped. The underlying substrate is removed as well, sparing a contact portion of the electrode basis and the counter electrode basis. On the electrode basis and the counter electrode basis the carbon nanotubes are grown, both on the upper and the lower side. Finally, an encapsulation of the supercapacitor is begun on its lower side, an electrolyte brought between the electrode and the counter electrode and the encapsulation of the supercapacitor finalized.

EP 1 146 527 A2 discloses a supercapacitor comprising an electrode and a counter electrode. The electrode and the counter electrode are realized as plates arranged in parallel to one another, between which an electrolyte is provided. The electrode and the counter electrode are separated by a separator arranged between the electrode and the counter electrode. The electrode and the counter electrode each comprise a matrix of carbon nanotubes on their surfaces turned towards one another. In this way, the surface contributing to the double-layer capacitance and therefore the double-layer capacitance is intended to be increased.

DE 10 2013 104 396 A1 discloses an electrochemical storage device comprising an electrode and a counter electrode with surface structure elements meshing with one another in the direction in which the electrodes are distanced. The surface structure elements are arranged uniformly and in a coordinated fashion. Between the electrode and the counter electrode with the meshing surface structure elements an electrolyte is provided. The surface structure elements are manufactured by forming, embossing or stamping methods or by structured removal from a substrate out of which the electrode and/or the counter electrode are made. They may also be manufactured with a component separate from such a substrate. The surface structure elements are especially made of carbon nanotubes or graphene layers arranged in the way of lamellae.

US 2011/0073827 A1 discloses an electrochemical storage device in which an electrode and a counter electrode are realized within a nanopore of a substrate. Within the nanopore different layers are formed, where a first layer forms the electrode along a wall of the nanopore, a second layer applied to it forms an electrolyte and a third layer applied to this electrolyte forms the counter electrode.

Electrochemical storage devices or supercapacitors in which an electrode and a counter electrode face one another and in which surface structure elements extending from the electrode and the counter electrode overlap are, for example, known from US 2012/0282530 A1 and DE 100 53 276 C1 (corresponding to WO 02/35564 A1). According to US 2009/0021890 A1 and WO 2012/128763 A1 such overlapping surface structure elements are formed from carbon nanotubes.

SUMMARY OF THE INVENTION

The present invention relates to an electrochemical storage device for storing and providing electric energy. The electrochemical storage device comprises an electrode comprising an electrode basis and a counter electrode comprising a counter electrode basis, where the counter electrode is arranged with a distance to the electrode. Thus, energy can be stored by means of an electrical capacitance between the electrode and the counter electrode. The electrode on its electrode basis and the counter electrode on its counter electrode basis each comprise a surface-enlarging structure, that is, an electrode surface-enlarging structure and a counter electrode surface-enlarging structure, respectively. An electrolyte is arranged between the electrode and the counter electrode and thus separates the electrode from the counter electrode. The electrode basis extends in an electrode plane and the counter electrode basis extends in a counter electrode plane, but the electrode plane and the counter electrode plane fall together in a common contact plane of the electrode and the counter electrode. This is achieved by the electrode basis and the counter electrode basis each comprising parts of a conductive contact layer arranged on a non-conductive substrate.

Further, the present invention relates to an electrochemical storage device comprising multiple layers, where each layer comprises an electrode and a counter electrode, an electrolyte and a substrate as described above. The layers neighbor each other while being separated by the (non-conductive) substrate of each layer.

Further, the present invention relates to a method of manufacturing an electrochemical storage device. The method comprises applying a conductive contact layer to a non-conductive substrate; segmentally removing the conductive contact layer from the non-conductive substrate, thus forming an electrode basis from one partial area of the contact layer and a counter electrode basis from another partial area of the contact layer, the electrode basis and the counter electrode basis extending in a common contact plane; forming an electrode surface-enlarging structure on the electrode basis, the electrode basis and the electrode surface-enlarging structure forming an electrode; forming a counter electrode surface-enlarging structure on the counter electrode basis, the counter electrode basis and the counter electrode surface-enlarging structure forming a counter electrode, and arranging an electrolyte between the electrode and the counter electrode.

Further, the present invention relates to a method of manufacturing an electrochemical storage device comprising multiple layers, especially an electrochemical storage device comprising multiple layers as described above. Each layer comprising an electrode and a counter electrode, an electrolyte and a substrate is manufactured as described above. The layers are arranged neighboring each other while being separated by the (non-conductive) substrate of each layer.

With the novel electrochemical storage devices and the novel methods of manufacturing them is possible to achieve at least one advantage from the group comprising a higher energy density of the stored energy, a higher electrical capacitance and a higher power density as well as a compact mode of construction.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
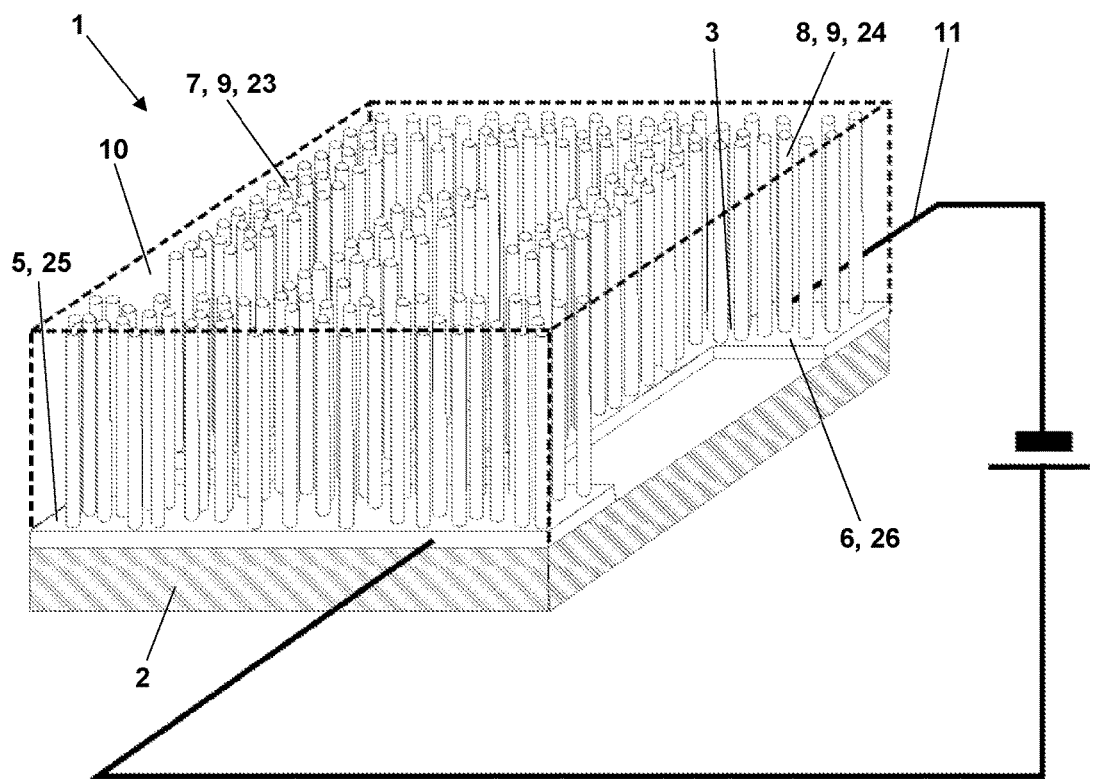
FIG. 1 shows a storage device according to the invention.

The invention relates to an electrochemical storage device for storing and providing electrical energy by means of its electrical capacitance, especially a so-called supercapacitor.

The storage device comprises an electrode and a counter electrode between which an electrolyte is arranged in such a way that it separates the electrode from the counter electrode. The electrode comprises an electrode basis and the counter electrode comprises a counter electrode basis. The electrode basis may be sheet-like, that is, it may possibly mainly extend in an electrode plane while only having a comparably small extension in a direction normal to the electrode plane. The electrode basis may also have any other shape in which the electrode plane is its main plane of extension. The counter electrode basis may in the same way be sheet-like, but in any case, like the electrode basis, mainly extends in a counter electrode plane.

On its surface both the electrode and the counter electrode comprise a surface-enlarging structure, that is, an electrode surface-enlarging structure and a counter electrode surface-enlarging structure, respectively. The electrode surface-enlarging structure may be realized in a different way than the counter electrode surface-enlarging structure. Preferably, however, the electrode surface-enlarging structure and the counter electrode surface-enlarging structure are realized in the same way. The electrode surface-enlarging structure and the counter electrode surface-enlarging structure deviate from a plane surface. For example, the surface may comprise recesses, straight or curved grooves, discrete or merging bumps, protrusions in the shape of cylindrical columns or with a square or hexagonal cross section, pyramids, hemispheres or half-ellipsoids or other structure-forming modifications such as spiral or helical (helicoid) structures. Different structure-forming modifications may be combined.

The electrode surface-enlarging structure and the counter electrode surface-enlarging structure in an advantageous way enlarge the surfaces of the electrode and the counter electrode and therefore increase the capacitance of the storage device. This can be illustrated as follows: For a plate capacitor, the capacitance C follows the equation $C = \varepsilon_0 \varepsilon_r A/d$ (with the vacuum permittivity $\varepsilon_0$, the relative permittivity $\varepsilon_r$ of the electrolyte, the distance d of electrode and counter electrode and the surface A of each of the electrode and the counter electrode). For a given electrolyte, $\varepsilon_0$ and $\varepsilon_r$ are constants. Therefore, the capacitance can only be increased by choosing the distance as small as possible and the surface as large as possible. Applying the electrode surface-enlarging structure and the counter electrode surface-enlarging structure therefore increases the capacitance of the storage device.

In the storage device according to the invention, the electrode plane and the counter electrode plane fall together into a contact plane. Compared to known storage devices, therefore an electric contacting of the storage device is much simplified. It is sufficient if electric contacts are made in the contact plane. In common storage devices, the electrode has to be contacted in one contact plane and the counter electrode has to be contacted in another contact plane. In order to achieve this, separate collectors for both the electrode and the counter electrode are necessary, the presence of which as well as the "stacking" of electrode and counter electrode occurring in a thickness direction (i.e. perpendicular to the electrode plane and the counter electrode plane) leads to the storage device according to the invention having a more compact, flatter mode of construction than the common storage device.

The electrode basis and the counter electrode basis are arranged on a common substrate. The electrode basis and the counter electrode basis each comprise parts of a conductive contact layer which defines the contact plane. For the contact layer, all conductive materials are suitable. Such materials are preferred which can be applied to the substrate in a simple way or with which the substrate can be coated in a simple way. Metals, graphite or conductive polymers such as polypyrroles, polyanilines, pentacenes or polythiophenes are especially preferred. The electrode basis and the counter electrode basis preferably are made of the same material; it is, however, possible for the electrode basis and the counter electrode basis to be fully or partially made of different materials.

The contact layer can for example be applied to the substrate by means of chemical (CVD) or physical vapor deposition (PVD), atomic layer deposition (ALD), electroplating or dip coating.

The substrate may comprise any suitable materials suitable for carrying a material of the electrode and a material of the counter electrode, especially materials suitable to be coated with such a material. In order to ovoid short-circuiting between the electrode and the counter electrode, the substrate itself must not be electrically conductive. Preferably, the substrate is an isolator. As an isolator, ceramics and polymers are preferred. The substrate may be composed of different materials, by mixing or alloying materials as well as by layering materials in order to form the substrate. The substrate may be a solid material, but also a porous material or a foam such as for example a gradient material or an aerogel.

If the substrate is impervious to fluids, no additional sealing of the storage device is necessary when as an electrolyte a fluid electrolyte is to be employed. This fluid electrolyte is already prevented from leaking downwards from the storage device by the fluid-impervious substrate.

Due its compact, flat mode of construction, the storage device according to the invention is especially suitable to be realized as a stacked storage device, where multiple layers of the storage device are stacked. Each of the layers is constructed in the way described before, with an electrode, a counter electrode, an electrolyte and a substrate. Since the substrate is not electrically conductive, the multiple layers can touch each other without a problem, that is, without undesired electrical contacts occurring.

Stacking may also be achieved by the storage device being rolled up cylindrically or in another way. Effectively, in this way layers of the storage device result that are arranged one on top of the other, having the same effect as stacking. With a given length of the resulting cylinder, this compact, flat mode of construction together with the separating effect of the electrically non-conductive substrate means that a cylindrical storage device with a smaller diameter at the same capacitance or a cylindrical storage device of a conventional diameter but larger capacitance can be produced.

Forming the electrode surface-enlarging structure and the counter electrode surface-enlarging structure also is simplified by the common contact plane since the electrode and the counter electrode, that is, the electrode basis and the counter electrode basis, are accessible at the same time.

In one embodiment of the invention, the surfaces of electrode and counter electrode lying opposite one another are additionally enlarged by the electrode basis and the counter electrode basis meshing with each other in the contact plane. Preferably, the electrode basis and the counter electrode basis mesh with each other in the shape of a comb or of fingers. It is, however, also possible that the electrode basis and the counter electrode basis mesh with each other in the shape of meanders or spirals. Another realization of meshing arms, tapes or teeth of the electrode basis and the counter electrode basis is possible, for example the electrode basis and the counter electrode basis may comprise triangular or irregularly formed meshing teeth.

In a preferred embodiment of the invention, the electrode surface-enlarging structure and the counter electrode surface-enlarging structure comprise surface structure elements. Surface structure elements are present when the respective surface-enlarging structure forms separately protruding discrete structures recognizable as separate elements. For example, surface structure elements may be present in that the surface has a "bumpy" or "hilly" structure with separate bumps. Surface structure elements may extend into the electrolyte having any shape. For example, the surface structure elements may be cylindrical, cubical or cuboid, parallelepiped-shaped, prismatic (also hexagonally prismatic), sheet-like, lamellae-like, pyramid-shaped, cone-shaped, hemispherical, half-ellipsoidal, spiral-like, helical (helicoid) or they may be other regularly or irregularly shaped surface structure elements, where combinations of different surface structure elements are possible. The surface structure elements are especially preferred to be elongatedly cylindrical or sheet-like, especially lamellae-like.

In a preferred embodiment of the invention, each of the surface structure elements has a main axis. If the surface structure elements for example are elongatedly cylindrical, the main axis is the longitudinal axis of the cylinder. If the surface structure elements are sheet-like or lamellae-like, the main axis is one of the main directions of extension of the surface structure elements. In a preferred embodiment, the main axes of the surface structure elements are parallel to one another. "Parallel" here means that if they do not touch in the contact plane, the surface structure elements do not touch in their further extension, either. If the surface structure elements therefore are elongatedly cylindrical, the surface structure elements substantially point in the same direction, where the angles of their main axes with respect to a common reference plane do not deviate from one another so much that the surface structure elements touch. If the surface structure elements are sheet-like or lamellae-like, they are arranged in the way of lamellae. This means the main planes of extension of neighboring surface structure elements can be brought into identical positions by shifting them along the same vectors. In this case, too, the surface structure elements do not touch if they do not touch in the contact plane.

Furthermore, the main axes of the surface structure elements are preferably transverse to the contact plane. "Transverse" here means that the main axes of the surface structure elements with respect to the contact plane take up an angle between 80° and 100°, preferably between 85° and 95°, especially preferably between 88° and 92°. Especially preferably, the main axes of the contact elements are arranged perpendicular to the contact plane.

In one embodiment of the invention, the surface structure elements essentially consist of carbon. This may be any known manifestation of carbon, where the carbon may be present in pure form, for example as graphite, diamond or fullerene, but also in chemically bound form, for example as coal. The carbon may also be present in the form of mixtures in which either different manifestations of carbon are mixed or carbon is mixed with other materials. However, any other suitable electron-conducting material may also be employed for the surface structure elements that has sufficient electrochemical stability when exposed to the electrolyte.

In a preferred embodiment of the invention, the surface structure elements comprise carbon nanotubes. The carbon nanotubes may have been applied onto the contact layer as completely formed carbon nanotubes or may have been grown on it.

In a further preferred embodiment of the invention, the surface structure elements comprise graphene layers. The graphene layers preferably are arranged in a lamellae-like way and do not touch each other, so that a high surface increase of the both the electrode and the counter electrode is achieved.

In one embodiment of the invention, the electrolyte comprises a solid body electrolyte. A solid body electrolyte may for example be Nafion applied onto the electrode, the counter electrode and the interspace by vapor-depositing Teflon and functionalizing it with sulfonic acid groups. For the solid body electrolyte, for example lithium mixed oxides, lithium mixed sulfides or other ion-conductive polymers are suitable, which also may have been modified with protonic acids.

In a further embodiment, the electrolyte comprises a fluid electrolyte. As the fluid electrolyte, for example, ionic fluids and their mixtures with protonic acids (Brønstedt acids) may be employed. For aqueous electrolytes with water as the solvent, protonic acids such as sulfuric acid, alkalis such as potassium hydroxide or salts such as quaternary phosphonium salts, sodium perchlorate ($NaClO_4$), lithium perchlorate ($LiClO_4$) or lithium hexafluoride arsenate ($LiAsF_6$) are suitable. Furthermore, electrolytes with organic solvents such as acetonitrile, propylencarbonate, tetrahydrofurane, diethylcarbonate, γ-butyrolactone and with quaternary ammonium salts or alkyl ammonium salts such as tetraethylammonium tetrafluoroborate ($N(Et)_4BF_4$) or triethyl (methyl)-ammoniumtetrafluoroborate ($NMe(Et)_3BF_4$) may be employed.

In one embodiment of the invention, the electrolyte covers the surface structure elements partially or completely. The electrolyte may have any thickness on the surface structure elements, up to filling all the interspaces between the surface structure elements. The electrolyte also covers the electrode basis and the counter electrode basis if these have free surfaces. The electrolyte at least has to contact the electrode as well as the counter electrode in a continuous electrolyte layer. In order to obtain a surface as large as possible that can add to the capacitance of the storage device, the electrolyte covers the electrode and the counter electrode for a portion as large as possible, preferably completely. Interspaces between the surface structure elements may remain free, that is, they do not have to be filled by the electrolyte. If the electrolyte has a continuous thickness, the storage device in this way obtains a surface that essentially follows the surface of the electrode and the counter electrode with the surface structure elements.

In a further embodiment of the invention, the electrolyte fills the interspace between the surface structure elements (which may also be limited by the electrode basis and the counter electrode basis as well by as the substrate). If the electrode and the counter electrode are completely covered by the electrolyte, the storage device may have a plane surface.

In one embodiment of the invention, the electrode and/or the counter electrode on its respective surface turned towards the electrolyte comprises a transition metal oxide in the way of a composite electrode. The transition metal oxide may completely or only partially cover the electrode and/or the counter electrode. Preferably, the transition metal oxide has a small layer thickness. Preferably, the transition metal oxide is chosen to be iridium oxide ($IrO_2$), iron oxide ($Fe_3O_4$) or manganese oxide ($MnO_2$), especially preferably ruthenium(IV)-oxide (also ruthenium dioxide, $RuO_2$). Instead of a transition metal oxide, any other coating of the surface of the electrode and/or the counter electrode may be chosen which allows using or increasing a pseudocapacitance of the storage device. For example, a sulfur compound such as titanium sulfide ($TiS_2$), a mixture of a transition metal and a sulfur compound such as that of ruthenium(IV)-oxide with sulfuric acid ($H_2SO_4$), a nitride of e.g. molybdenum, titanium or iron or lithium ions may be chosen.

A width of the electrode and the counter electrode and a distance of the electrode from the counter electrode preferably are between 2 nm and 50 nm. According to the above formula $C=\varepsilon_0\ \varepsilon_r\ A/d$, the capacitance C in an advantageous way is particularly large when the distance d of the electrode and the counter electrode is particularly small. For this reason, according to the invention a distance of the electrode and the counter electrode is chosen in the region of a few nanometers. Such a distance corresponds to the size range of carbon nanotubes. If the width of the electrode and the counter electrode is chosen in this size range, the electrode and the counter electrode may mesh in an especially advantageous way, in which way their effective surfaces are maximized. If the width of the electrode and/or the counter electrode is chosen in such a way that there is only just enough space for one row of carbon nanotubes (i.e. in the region of the diameter of one carbon nanotube), each single carbon nanotube can fully contribute to the capacitance of the storage device.

In a method according to the invention, an electrochemical storage device is manufactured, especially a storage device as has been described above.

In this method, an electrode basis and a counter electrode basis are formed in a common contact plane, on each of which a surface-enlarging structure (that is, an electrode surface-enlarging structure and a counter electrode surface-enlarging structure, respectively) is formed, forming an electrode and a counter electrode, respectively. An electrolyte is inserted between the electrode formed in this way and the counter electrode formed in this way.

For manufacturing the storage device, a conductive contact layer, for example a conductive contact layer as has been described before in the context of the storage device according to the invention, is applied to an electrically non-conductive substrate. The electrically non-conductive substrate may correspond to the substrate described above in the context of the storage device according to the invention. Subsequently, the conductive contact layer is segmentally removed. From a part remaining when the contact layer is segmentally removed, the electrode basis is formed; from another part remaining when the contact layer is segmentally removed, the electrode basis is formed. During the removal of the contact layer, that part from which the electrode basis is formed is separated from that part from which the counter electrode basis is formed, so that between the electrode basis and the counter electrode basis and therefore between the electrode and the counter electrode no electrically conductive connection caused by the contact layer remains. The only electrically relevant connection between the electrode and the counter electrode is formed by the application of the electrolyte.

In one embodiment of the invention, the contact layer is removed with a laser beam, a focused ion beam (FIB) or by a plasma etching technique. However, any suitable method may be employed with which the contact layer can be purposefully removed without the substrate being removed or at least substantially decreased in its thickness.

In a further preferred embodiment of the invention, catalyst particles, for example with iron, nickel, cobalt or yttrium, are embedded into the contact layer for growing carbon nanotubes. The catalyst particles may be embedded in the contact layer before the contact layer is applied to the substrate or at least before it is brought into its shape as the contact layer. The catalyst particles may, however, also be embedded into the contact layer after is has been applied to the substrate or brought into its shape as the contact layer. The catalyst particles may also still be embedded into the contact layer after it has already been separated into the electrode basis and the counter electrode basis. The catalyst particles enable or simplify the growing of carbon nanotubes on the contact layer.

In a preferred embodiment of the invention, the electrode surface-enlarging structure and/or the counter electrode surface-enlarging structure are formed by carbon nanotubes growing on the electrode basis and/or the counter electrode basis. The carbon nanotubes preferably grow in parallel to one another. It is, however, not necessary for all carbon nanotubes to grow in parallel, since carbon nanotubes which are not parallel to the other carbon nanotubes can be removed before the electrolyte is applied. The electrode surface-enlarging structure and the counter electrode surface-enlarging structure can, however, not only be formed by growing carbon nanotubes, but also by forming other surface structure elements such as the ones mentioned previously in the context of the storage device according to the invention. For example, graphene layers may grow or a structure of the electrode and the counter electrode basis may be embossed or may be formed by removal or application of material.

In a preferred embodiment of the invention, the carbon nanotubes grow under the influence of an electrical field. The electrical field influences the direction of the growing carbon nanotubes in such a way that a higher parallelity of the carbon nanotubes is achieved.

In one embodiment of the invention, the carbon nanotubes grow by plasma-enhanced chemical vapor deposition (PECVD, also plasma-assisted chemical vapor deposition, PACVD). Other methods known for growing carbon nanotubes may also be chosen, however.

In a further embodiment of the invention, the electrolyte is applied onto the electrode and the counter electrode by chemical vapor deposition (CVD) or atomic layer deposition (ALD). However, other known methods may also be chosen which are suitable for applying the electrolyte onto the electrode and the counter electrode. Such methods can differ depending on the kind of the chosen electrolyte. For example, according to the invention it is preferred to surround the electrode and the counter electrode with Teflon via the gas phase in a CVD process and subsequently, also via the gas phase, to functionalize the Teflon with sulfonic acid groups, so that as the electrolyte or as part of the electrolyte Nafion is formed. For example, the electrolyte may also be applied via the fluid phase, however.

In a further embodiment of the invention, a transition metal oxide is applied onto the electrode and/or the counter electrode. By means of the transition metal oxide, preferably $RuO_2$, a pseudocapacitance of the storage device is provided or increased.

In one embodiment of the invention, the transition metal oxide is applied by chemical (CVD) or physical vapor deposition (PVD).

In a preferred embodiment of the invention, the electrode basis and the counter electrode basis are formed before the electrode surface-enlarging structure and the counter electrode surface-enlarging structure are formed. In this way, the contact layer into which possibly the catalyst particles are embedded may for example be separated into the electrode basis and the counter electrode basis using the FIB technique before the growing of the carbon nanotubes is triggered. The carbon nanotubes therefore only grow on the electrode basis and the counter electrode basis, but not on the partial region of the substrate that was uncovered during the separation of the electrode basis and the counter electrode basis. For forming the electrode basis and the counter electrode basis and for forming the electrode surface-enlarging structure and the counter electrode surface-enlarging structure, all the aforementioned methods may be employed.

In a further preferred embodiment of the invention, the electrode surface-enlarging structure and the counter electrode surface-enlarging structure are formed before the electrode basis or the counter electrode basis are formed. For example, on the contact layer into which possibly catalyst particles have been embedded, at first carbon nanotubes may grow. After the carbon nanotubes have grown, the electrode basis and the counter electrode basis are formed in that the contact layer is separated. During this step, those carbon nanotubes are also removed which had grown in the region in which the contact layer is removed or which extend above this region. This is especially advantageous since carbon nanotubes which are in danger of causing short-circuiting between the electrode and the counter electrode, not having grown parallel to the others, are removed in the separation of the contact layer. For forming the electrode basis and the counter electrode basis and for forming the surface-enlarging structure, which in this case at the point of its formation is not yet separated into the electrode surface-enlarging structure and the counter electrode surface-enlarging structure, all aforementioned methods may be employed. In this process, that part of the (not yet separated) surface-enlarging structure or that fraction of the surface structure elements that is arranged in the portion of the contact layer being removed during the formation of the electrode basis and the counter electrode basis is also removed in each instance.

When the contact layer is segmentally removed, the surface-enlarging structure, which at this point comprises both what is to become the electrode surface-enlarging structure and what is to become the counter electrode surface-enlarging structure, is separated into a part connected to one remaining part of the contact layer and a part connected to the other remaining part of the contact layer. This means that after the separation one part of the surface-enlarging structure, that is, the electrode surface enlarging structure, is connected to the electrode basis and forms the electrode while the other part of the surface-enlarging structure, that is, the counter electrode surface-enlarging structure, is connected to the counter electrode basis and forms the counter electrode.

The storage device according to the invention can be stacked for forming a compact construction element without having to be further encapsulated, since the electrically non-conductive substrate electrically separates the layers from one another. The storage device in the same way can also be cylindrically or otherwise rolled up without a further isolating encapsulation.

Referring now in greater detail to the drawings, FIG. 1 shows a storage device 1 according to the invention. The storage device 1 comprises a substrate 2 on which an electrode 25 and a counter electrode 26 are arranged. The electrode 25 comprises an electrode basis 5 and an electrode surface-enlarging structure 23 with surface structure elements 7 in the shape of carbon nanotubes 9. The counter electrode 26 comprises a counter electrode basis 6 and a counter electrode surface-enlarging structure 24 with surface structure elements 8 in the shape of carbon nanotubes 9. An electrolyte 10 has been applied to the electrode 25, the counter electrode 26 and uncovered portions of the substrate 2. The electrode 25 and the counter electrode 26 are provided with electric contacts 11.

For simplicity, here and in the following figures only a very small storage device 1 is shown which can also be seen as a cutout from a larger storage device 1. The storage device 1 shown has real dimensions in its main plane of extension in the region of a few to a few hundred nanometers. The storage device 1 according to the invention can be very much larger and usually has macroscopic dimensions. In height, the figures show the storage device 1 completely, however. The height of the storage device 1 according to the invention is essentially defined by the surface-enlarging structures 23, 24 or surface structure elements 7, 8 of the electrode 25 and the counter electrode 26. If, as shown, the surface-enlarging structures 23, 24 or surface structure elements 7, 8 are formed by carbon nanotubes 9, the height of the storage device 1 is also in the range of a typical length of a carbon nanotube 9 (plus a thickness of the substrate 2, if applicable).

Figure 2:
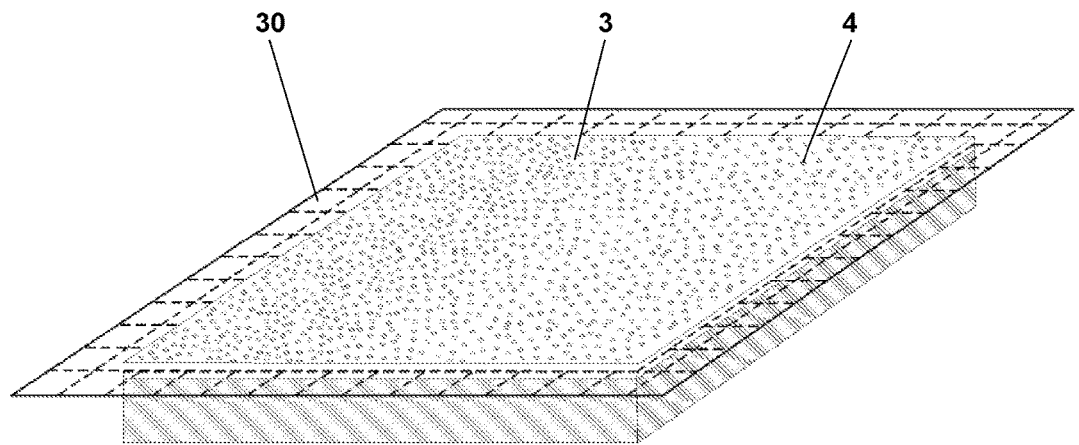
FIG. 2 shows a storage device according to the invention after a first manufacturing step, that is, after forming a contact layer.

FIG. 2 illustrates a first manufacturing step for manufacturing the electrochemical storage device 1 according to the invention, starting from the substrate 2. The substrate 2 is electrically non-conductive and for example may comprise a ceramic, a polymer or any other suitable material. A contact layer 3 has been applied onto the substrate 2, into which catalyst particles 4 are embedded. The contact layer 3 defines a contact plane 30. The catalyst particles 4 enable or simplify carbon nanotubes 9 growing on the contact layer 3 in a subsequent manufacturing step. The contact layer 3 is conductive and may for example be formed of graphite, a metal or a conductive polymer such as polypyrrole, polyaniline, pentacene or polythiophene. It may be applied to the substrate 2 in any suitable way, for example by application via a gas phase or a fluid phase.

Figure 3:
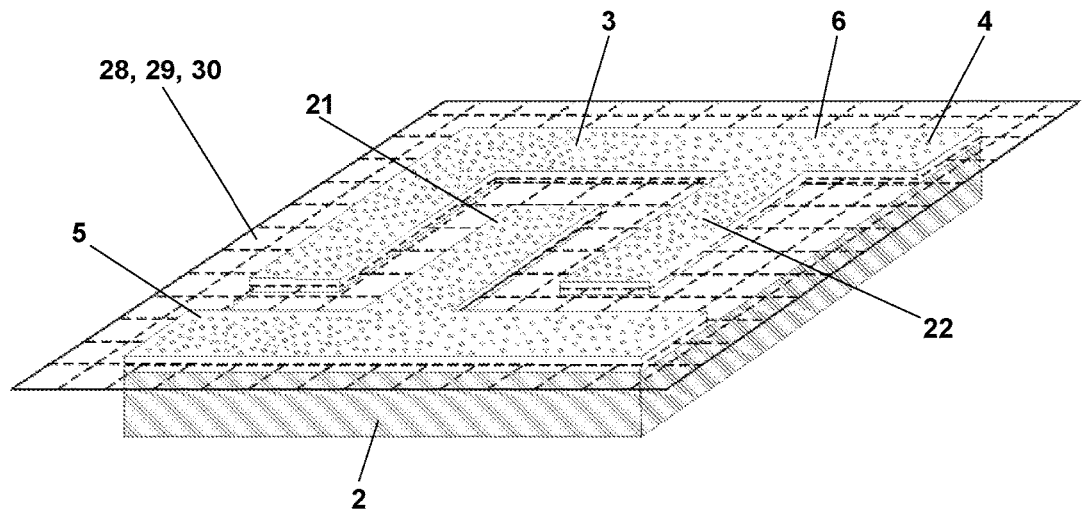
FIG. 3 shows a storage device according to the invention after a second manufacturing step, that is, after forming an electrode basis and a counter electrode basis.

FIG. 3 shows a second manufacturing step for manufacturing the storage device according to the invention. On the substrate 2, only parts of the contact layer 3 with the catalyst particles 4 are left. This has been achieved by removing the contact layer 3 segmentally, for example with a laser, a focused ion beam or a plasma etching technique. The remaining parts of the contact layer 3 form the electrode basis 5 and the counter electrode basis 6. FIG. 3 shows a typical configuration in which a substantial part of the electrode basis 5 extends along a longitudinal edge of the substrate 2, while a substantial part of the counter electrode basis 6 extends along an opposite longitudinal edge of the substrate 2. Between the electrode basis 5 and the counter electrode basis 6, a region of the substrate has been uncovered by the removal of the contact layer 3. This region separates the electrode basis 5 from the counter electrode basis 6.

The electrode basis 5 defines an electrode plane 28 and the counter electrode basis 6 defines a counter electrode plane 29. FIG. 3 shows that the electrode plane 28 and the counter electrode plane 29 fall together in the contact plane 30. This is caused by the electrode basis 5 and the counter electrode basis 6 having been formed by separating and removing the same contact layer 3, where the contact layer 3 defines the contact plane 30.

FIG. 3 indicates the electrode basis 5 and the counter electrode basis 6 meshing in the way of combs. Such meshing is not necessary for the function of the storage device according to the invention, but enlarges its capacitance in an advantageous way. In FIG. 3, only one meshing element 21 for the electrode basis 5 and two meshing elements 22 for the counter electrode basis 6 are shown. In a typical, macroscopic storage device, however, substantially more meshing elements 21, 22 mesh. The meshing elements 21, 22 are not necessarily of the shown rectangular basic shape, they may also be triangular, hemispherical, spiral-shaped, meander-shaped, oblong with rounded corners or regularly or irregularly shaped in any other suitable way.

Figure 4:
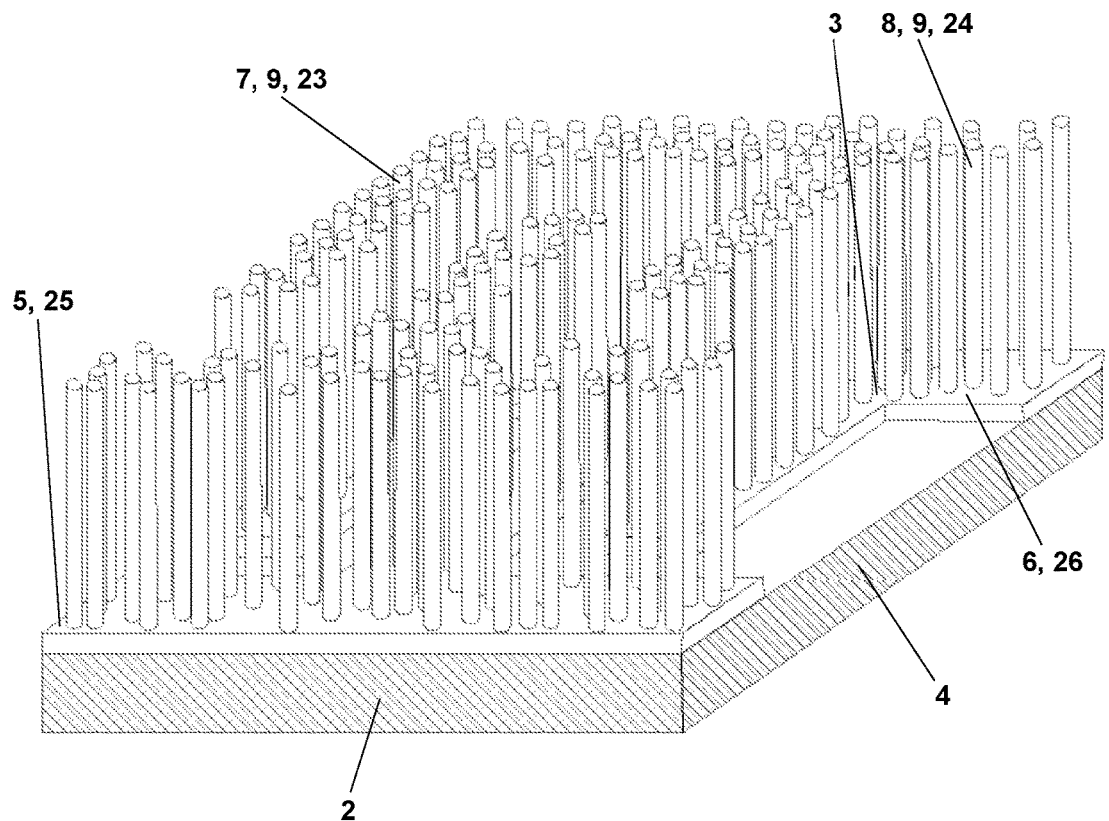
FIG. 4 shows a storage device according to the invention after a third manufacturing step, that is, after growing carbon nanotubes.

A third manufacturing step is illustrated in FIG. 4. On the electrode basis 5 and the counter electrode basis 6 on the substrate 2, carbon nanotubes 9 have grown. Their growing was enabled or simplified by the catalyst particles 4 in the contact layer 3. For example, the carbon nanotubes 9 may have been grown by a plasma-enhanced chemical vapor deposition, but also by any other suitable method. The carbon nanotubes 9 may have been grown under the influence of an electric field, which has the effect of causing a higher parallelity of the carbon nanotubes 9.

The carbon nanotubes 9 have only grown on the electrode basis 5 and the counter electrode basis 6 and therefore only in those parts of a surface of the substrate 2 still covered by the remaining portions of the contact layer. As surface structure elements 7, they form the electrode surface-enlarging structure 23 of the electrode 25 and as surface structure elements 8 the counter electrode surface-enlarging structure 24 of the counter electrode 26. The surface structure elements 7 of the electrode 25 together with the electrode basis 5 form the electrode 25, while the surface structure elements 8 of the counter electrode 26 together with the counter electrode basis 6 form the counter electrode 26. The surface-enlarging structure 23, 24 enlarges the surface of the electrode 25 and the counter electrode 26 and therefore the capacitance of the storage device. The surface-enlarging structure 23, 24 may also be enabled in another way than by discrete surface structure elements 7, 8, for example by a continually wavy surface-enlarging structure 23, 24. Discrete surface structure elements 7, 8 may take up any suitable form, e.g. apart from the cylindrical structure of carbon nanotubes 9 they may also form a sheet-like or lamellae-like structure (such as graphene) or be pyramid-shaped, hemispherical or regularly or irregularly shaped in any other way. Preferably, the surface structure elements 7, 8 in their main axes are parallel with respect to one another and/or transverse to the contact plane 30; they can, however, be arranged in a another way. It is preferred for the surface structure elements 7, 8 not to touch one another.

Figure 5:
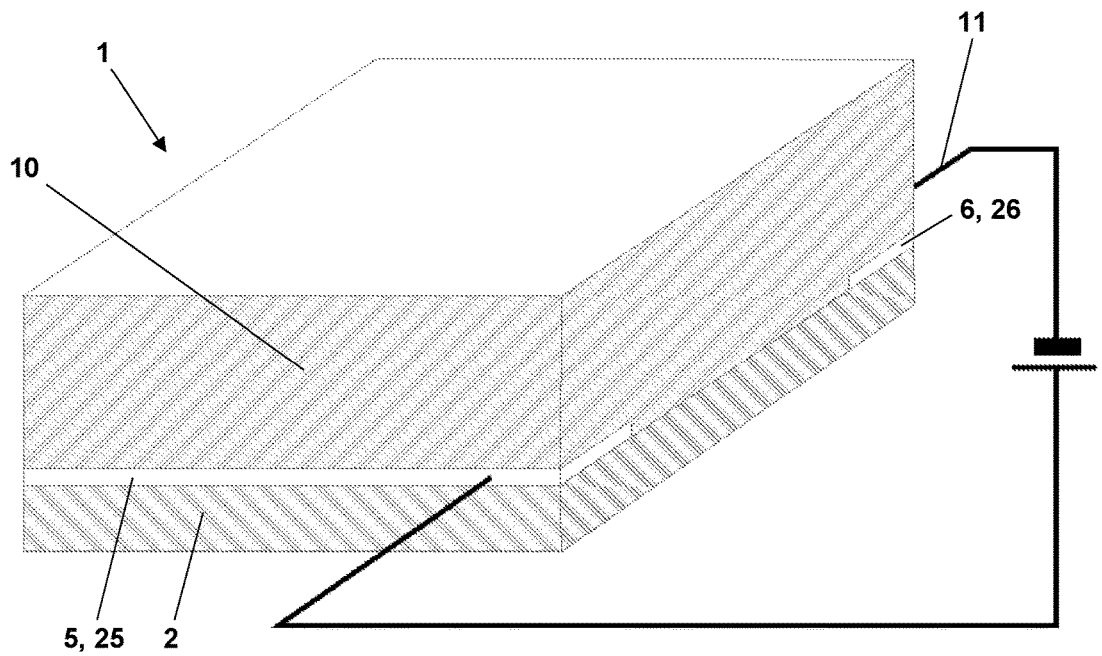
FIG. 5 shows a storage device according to the invention after a final manufacturing step, that is, after the placement of an electrolyte; and therefore in a state ready to operate.

FIG. 5 shows a fourth manufacturing step for manufacturing the storage device 1 according to the invention. Therefore at the same time it shows the storage device 1 ready to operate. The storage device 1 shown in FIG. 5 corresponds to the storage device 1 shown in FIG. 1. For clarification, however, in FIG. 5 the electrolyte 10 is shown as opaque, while in FIG. 1 it is shown as transparent.

In FIG. 5, the electrolyte 10 has been applied to the electrode 25, the counter electrode 26 and the uncovered parts of the substrate 2. The electrolyte 10 may for example have been applied by chemical vapor deposition or atomic layer deposition.

The electrolyte 10 completely covers the electrode basis 5, the counter electrode basis 6, the uncovered portions of the substrate 2 and the surface structure elements 7, 8. In the example shown, the electrolyte 10 also completely or nearly completely fills the interspaces between the surface structure elements 7, 8. It is, however, also possible that the electrolyte 10 fills the interspaces only partially or only covers the surface of the electrode 25 and the counter electrode 26 and the uncovered parts of the substrate 2 without filling the interspaces. The electrolyte 10 may be a solid body electrolyte or a fluid electrolyte.

In FIG. 5 the electrode 25 and the counter electrode 26 are also shown to have been provided with the electric contacts 11. The electric contacts 11 are necessary for the storage device to be operated according to its design. It is possible that the electrode 25 and the counter electrode 26 are only contacted when the electrolyte 10 has been applied. Preferably, however, the electrode 25 and the counter electrode 26 are already contacted in an earlier manufacturing step. Especially preferably the contact 11 is already applied when the contact layer 3 is formed, that is, before forming the electrode basis 5 and the counter electrode basis 6. The contacts 11 in this way can be embedded into the contact layer 3 during its application or be mounted between the non-conductive substrate 2 and the contact layer 3. The electrode basis 5 and the counter electrode basis 6 therefore are contacted right away, before the remainder of the storage device 1 is manufactured.

Figure 6:
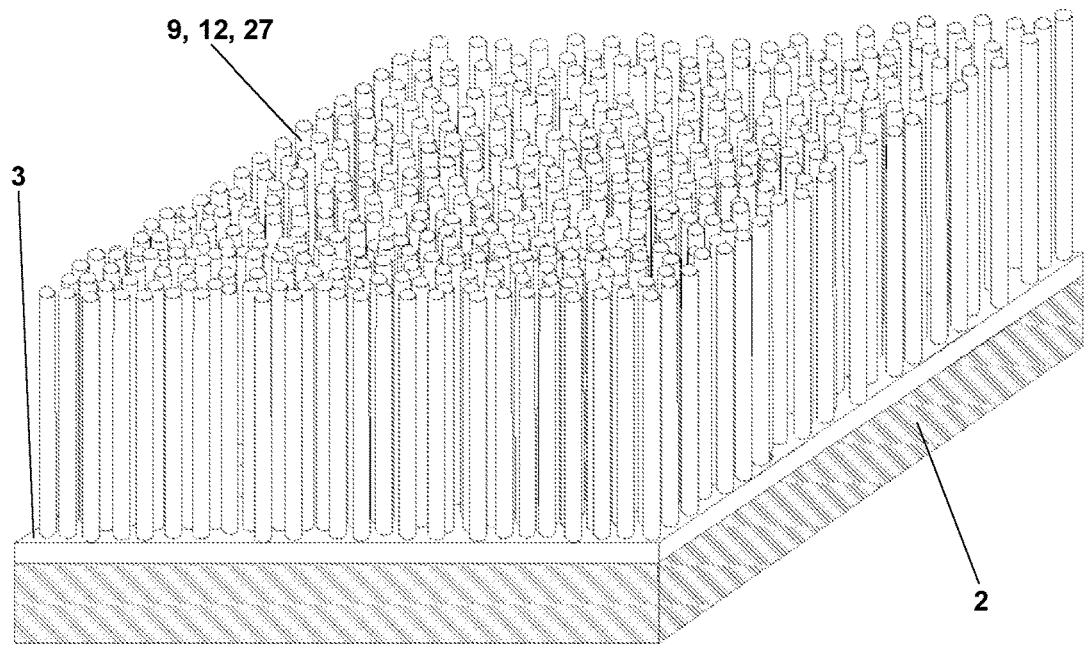
FIG. 6 shows a storage device according to the invention after an alternative second manufacturing step, that is, after growing carbon nanotubes.

FIG. 6 shows an alternative second manufacturing step for manufacturing a storage device 1 according to the invention. Carbon nanotubes 9 have grown as surface structure elements 12 for forming a surface-enlarging structure 27 on the contact layer 3, without the contact layer 3 having already been separated into the electrode basis 5 and the counter electrode basis 6. The contact layer 3 therefore still is continuous and it cannot be distinguished which surface structure elements 12 will later be assigned to the electrode 25 and which will later be assigned to the counter electrode 26. In the same step in which the contact elements 3 are separated into the electrode basis 5 and the counter electrode basis, the surface-enlarging structure 27 is separated into the electrode surface-enlarging structure 23 of the electrode 25 and the counter electrode surface-enlarging structure 24 of the counter electrode 26. At the same time, the surface structure elements 12 are separated into the surface structure elements 7 of the electrode 25 and the surface structure elements 8 of the counter electrode 26. If, therefore, FIGS. 2 to 5 depict a sequence illustrating a manufacturing method, then for an alternative manufacturing method FIG. 6 replaces FIG. 3.

In order to reach the state shown in FIG. 4 starting from the state shown in FIG. 6, the latter retaining the continuous contact layer 3 on which carbon nanotubes 9 form surface structure elements 12, the electrode basis 5 and the counter electrode basis 6 have to be formed. This is done in the way explained above, that is, by segmentally removing the contact layer 3. Differently to the method explained above, the carbon nanotubes 9 are partially removed, too, as far as they are arranged in the region of the contact layer 3 which has to be removed for forming the electrode 25 and the counter electrode 26.

Figure 7:
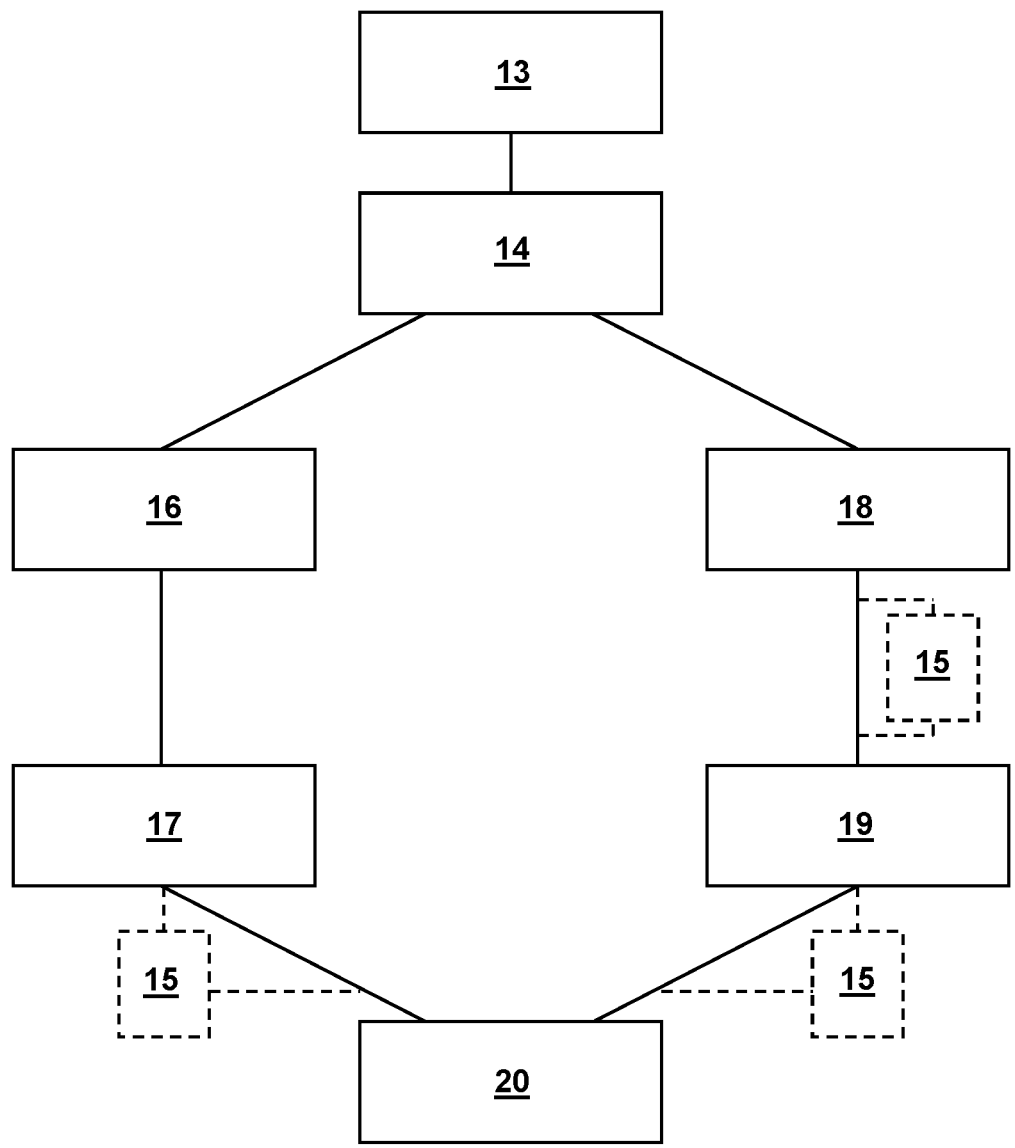
FIG. 7 shows a flow diagram of a manufacturing method of a storage device according to the invention.

FIG. 7 shows a schematic flow diagram of a method of manufacturing a storage device according to the invention. In a step 13 the substrate 2 is provided. In a step 14, the contact layer 3 is applied onto the substrate 2 (cp. FIG. 2).

In one variant of the method, in a step 16 the electrode basis 5 and the counter electrode basis 6 are formed (cp. FIG. 3), on which in a step 17 the surface-enlarging structure 23, 24 is formed. This variant of the method corresponds to FIGS. 2 to 5.

In an alternative variant of the method, the surface-enlarging structure 27 is formed in a step 18 (cp. FIG. 6). Step 18 therefore corresponds to step 17, with the difference that the surface-enlarging structure 27 or the surface structure elements 12 cannot already be distinguished to be either electrode surface-enlarging structure 23 or surface structure elements 7 or, distinctly, counter electrode surface-enlarging structure 24 or surface structure elements 8 of a counter electrode 26. In a step 19, the electrode basis 5 and the counter electrode basis 6 are formed. Step 19 therefore corresponds to step 16, with the difference that while the contact layer 3 is removed possibly parts of the surface-enlarging structure 27 or some individual surface structure elements 12 are also removed.

Optionally, in a step 15 a transition metal oxide such as for example $RuO_2$ can be applied to the entire electrode 25 or parts of it and/or the entire counter electrode 26 or parts of it, in order to use or enhance a pseudocapacitance. The transition metal oxide can be applied after forming the surface-enlarging structure 23, 24, 27 in step 17 or step 18 or after forming the electrode basis 5 and the counter electrode basis 6 in step 19. For applying the transition metal oxide, any suitable technique can be used, for example chemical or physical vapor deposition.

After executing steps 13, 14, 16 and 17 (and 15, if applicable) or steps 13, 14, 18 and 19 (and 15, if applicable), the electrode 25 and the counter electrode 26 have been formed, which comprise the electrode basis 5 and the electrode surface-enlarging structure 23 or the counter electrode basis 6 and the counter electrode surface-enlarging structure 24, respectively (cp. FIG. 4). In a step 20, the electrolyte 10 is arranged between the electrode 25 and the counter electrode 26 (cp. FIG. 5). The electrolyte can be applied by chemical vapor deposition, atomic layer deposition or another suitable method. For example, the electrolyte can be applied in that Teflon is deposited onto surfaces to be covered (e.g. the electrode 25, the counter electrode 26, parts of the substrate 2 and the surface structure elements 7, 8) and subsequently functionalized with sulfonic acid groups in order to produce Nafion. The electrolyte covers at least substantial parts of the electrode 25 and the counter electrode 26. It may, however, also cover interspaces between the electrode basis 5, the counter electrode basis 6 and the surface structure elements 7, 8, 12.

If in one of the previous steps contacts 11 have already been applied to the electrode 25 and the counter electrode 26 or if at the latest they are applied subsequently to step 20, after step 20 or at the latest at the application of the contacts 11, a storage device has been formed that is ready to operate.

Many variations and modifications may be made to the preferred embodiments of the invention without departing substantially from the spirit and principles of the invention. All such modifications and variations are intended to be included herein within the scope of the present invention, as defined by the following claims.

We claim:
1. A method of manufacturing an electrochemical storage device, the method comprising
   applying a conductive contact layer to a non-conductive substrate,
   segmentally removing the conductive contact layer from the non-conductive substrate, thus forming an electrode basis from one partial area of the contact layer and a counter electrode basis from another partial area of the contact layer, the electrode basis and the counter electrode basis extending in a common contact plane,
   forming an electrode surface-enlarging structure on the electrode basis, the electrode basis and the electrode surface-enlarging structure forming an electrode,
   forming a counter electrode surface-enlarging structure on the counter electrode basis, the counter electrode basis and the counter electrode surface-enlarging structure forming a counter electrode, and
   arranging an electrolyte between the electrode and the counter electrode.

2. The method of claim 1, wherein the contact layer is segmentally removed with a laser beam or a focused ion beam or by a plasma etching technique.

3. The method of claim 1, wherein at least one of the electrode surface-enlarging structure and the counter electrode surface-enlarging structure is formed by growing carbon nanotubes on the electrode basis and the counter electrode basis.

4. The method of claim 3, wherein the carbon nanotubes are grown according to least one of the following techniques: catalyst particles embedded into the contact layer, influence of an electrical field, and plasma-enhanced chemical vapor deposition.

5. The method of claim 1, wherein the electrolyte is applied to the electrode and the counter electrode by chemical vapor deposition or atomic layer deposition.

6. The method of claim 1, wherein a transition metal oxide is applied to at least one of the electrode and the counter electrode.

7. The method of claim 6, wherein the transition metal oxide is applied by chemical or physical vapor deposition.

8. The method of claim 1, wherein the conductive contact layer is segmentally removed from the non-conductive substrate after the electrode surface-enlarging structure and the counter electrode surface-enlarging structure are formed, wherein the electrode surface-enlarging structure and the counter electrode surface-enlarging structure are separated when the conductive contact layer is segmentally removed.

9. The method of claim 1, and further comprising the steps of
arranging a further non-conductive layer on the electrode surface-enlarging structure and the counter electrode surface-enlarging structure
applying a further conductive contact layer to the further non-conductive substrate,
segmentally removing the further conductive contact layer from the further non-conductive substrate, thus forming a further electrode basis from one partial area of the further contact layer and a further counter electrode basis from another partial area of the further contact layer, the further electrode basis and the further counter electrode basis extending in a further common contact plane,
forming a further electrode surface-enlarging structure on the further electrode basis, the further electrode basis and the further electrode surface-enlarging structure forming a further electrode,
forming a further counter electrode surface-enlarging structure on the further counter electrode basis, the further counter electrode basis and the further counter electrode surface-enlarging structure forming a further counter electrode, and
arranging a further electrolyte between the further electrode and the further counter electrode.

10. The method of claim 1, wherein the storage device is cylindrically rolled up.

* * * * *